(12) United States Patent
Strobel et al.

(10) Patent No.: US 7,655,341 B2
(45) Date of Patent: Feb. 2, 2010

(54) BIPOLAR PLATE FOR FUEL CELLS, WHICH IS FORMED FROM A SHAPED FOIL, AND METHOD FOR MANUFACTURING SAME

(75) Inventors: Raimund Strobel, Ulm (DE); Bernd Gaugler, Ulm (DE); Ludwig Jorissen, Neu-Ulm (DE); Kurt Hohe, Langenau (DE); Joachim Scherer, Ulm (DE); Dominique Tasch, Neu-Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 1071 days.

(21) Appl. No.: 10/813,820

(22) Filed: Mar. 31, 2004

(65) Prior Publication Data
US 2004/0217011 A1 Nov. 4, 2004

(30) Foreign Application Priority Data
Mar. 31, 2003 (DE) .................. 103 15 804

(51) Int. Cl.
*H01M 8/02* (2006.01)
*H01M 8/04* (2006.01)

(52) U.S. Cl. .......................... 429/39; 429/34
(58) Field of Classification Search ............... None
See application file for complete search history.

(56) References Cited

U.S. PATENT DOCUMENTS 6,555,261 B1 * 4/2003 Lewinski et al. .............. 429/34
2004/0033408 A1 * 2/2004 Zhang et al. .................. 429/34

FOREIGN PATENT DOCUMENTS

WO WO-01/82399 A1 11/2001

* cited by examiner

*Primary Examiner*—Jonathan Crepeau
(74) *Attorney, Agent, or Firm*—Marshall & Melhorn, LLC

(57) ABSTRACT

The present invention relates to a bipolar plate for fuel cells, comprising at least a shaped, at least partially electrically conductive foil (1), the bipolar plate having a channel structure (5) formed by the shaping of the foil (1), to convey reactants to electrodes of adjacent fuel cells and to carry away reaction products, and a microstructure (4) is integrated into the foil (1) to increase the rigidity of the foil (1). The invention also relates to a method for manufacturing corresponding bipolar plates.

16 Claims, 1 Drawing Sheet

BIPOLAR PLATE FOR FUEL CELLS, WHICH IS FORMED FROM A SHAPED FOIL, AND METHOD FOR MANUFACTURING SAME

CROSS-REFERENCE TO RELATED APPLICATIONS

Under 35 U.S.C. 119, this application claims the benefit of German Patent Application No. 103 15 804.9, filed Mar. 31, 2003.

FIELD OF THE INVENTION

The invention relates to a bipolar plate for fuel cells which comprises at least a shaped foil according to the preamble of the main claim, as well as to a method for manufacturing same.

BACKGROUND OF THE INVENTION

Bipolar plates of this type are packed closely on top of one another in so-called "stacks" and are arranged in series-connected fuel cells as an intermediate layer between the individual fuel cells. Thus they come to abut against respectively an electrode or gas-diffusion layer of two adjacent fuel cells, against an anode and a cathode. The bipolar plate here fulfils a plurality of functions, namely providing an electrically conductive connection for the series-connected fuel cells, conveying reactants to the electrodes of the adjacent fuel cells, carrying away the reaction products, cooling the fuel cells by heat transfer e.g. to an adjacent cooling chamber, and finally sealing connecting points of the fuel cells in a stack.

In order to accommodate as many fuel cells as possible in the smallest possible space and with the lowest possible total weight of the stack, and thus to achieve a high gravimetric and volumetric power density, an attempt is made to produce bipolar plates having as low a weight as possible and as small a thickness as possible. Using thin foils formed from metals such as e.g. stainless steel, aluminium or titanium for this purpose to manufacture bipolar plates is known. These foils are so shaped, e.g. by embossing, that a channel structure is formed which is suitable for conveying reactants to the electrodes of the adjacent fuel cells and for carrying away reaction products. As a result of the required rigidity of a bipolar plate, however, limits are set to the reduction of the thickness of foils of the prior art used; a minimum thickness of roughly 0.1 mm seems to be necessary. Correspondingly, according to the prior art, limits are also set to the gravimetric and volumetric power densities of fuel cell stacks, which in the case of desirable output voltages still lead to stacks of a disadvantageously high weight and large size.

SUMMARY OF THE INVENTION

The object underlying the invention, therefore, is to develop bipolar plates of thinner dimensions and lower weight in order to realise higher power densities in fuel cell stacks, if possible with simultaneous optimisation in respect of their above-mentioned functions. This object is accomplished according to the invention by a bipolar plate according to the characterising features of the main claim in conjunction with the features of the preamble of the main claim, as well as by a manufacturing method according to the features of claim 11. Advantageous embodiments and further developments arise with the features of the subordinate claims.

Because the foil is provided with a microstructure which increases its rigidity, it is possible to keep the thickness and weight of the foil substantially smaller than was possible in the prior art. The same thus also applies to the weight and thickness of the bipolar plate. When a plurality of bipolar plates are used in a fuel cell stack, this leads to an advantageous and desired increase in realisable power densities. With a suitable choice of the microstructure, the gain in rigidity and thus the attainable advantage can be considerable. The foil here preferably comprises a thin metal sheet with good electrical conductivity, formed for example from stainless steel, aluminium or titanium; however embodiments formed from some other material are also conceivable, at least partially electrically conductive, for example due to conductive bridges between opposite surfaces of the foil.

A microstructure comprising hexagons has proved to be particularly advantageous, in which the hexagons are joined together in honeycomb manner at least partially covering the surface; a corresponding structure formed from triangles or a combination of various polygons is also possible. Due to such microstructuring of the foil, a framework of ridges (e.g. embossed lines), which cover the surface at least partially and support the foil, is produced and this causes the increase in rigidity.

In an expedient realisation of the microstructure, the microstructure, like the channel structure also, can be embossed onto the foil. In a particularly expedient method of manufacturing a bipolar plate according to the invention, the foil is provided in a single embossing process both with the channel structure and with the microstructure. This is possible due to the use of an embossing tool with corresponding microstructuring of a surface receiving the foil during the embossing process. Apart from the embossing tool which is somewhat more expensive to design, the production of a bipolar plate according to the invention is thus not more expensive than that of the bipolar plate according to the prior art. The term is "embossing" is here used to encompass also related manufacturing methods such as "deep drawing" for example. It is also alternatively possible to produce these bipolar plates by means of etching methods e.g. wet chemical/photolithographic etching methods (see structure etching from chip manufacture).

Moreover hydroforming, magnetic shaping and roll embossing are also possible as alternative manufacturing methods.

Advantageously a typical length scale of between 1 μm and 500 μm, preferably between 1 μm and 100 μm is provided for the microstructure of the foil. Here it must be taken into account that firstly this typical length scale may not be too small for the desired effect of an increased rigidity, but on the other hand may also not be too large in order not to compete in terms of order of magnitude with other typical structural sizes/scales of the bipolar plate, such as channel diameters for example. The term "typical length scale" is here intended to be defined, in the case of uniform microstructuring with repeating units, as the distance between the centres of gravity of the surfaces of adjacent smallest repeating units, in a hexagonal microstructure having equal sides and equal angles e.g. as the distance between adjacent hexagon mid-points; in a more irregular structure the term is used to mean the mean value of the distances between the centres of gravity of the surfaces of adjacent units which are formed by the microstructuring but do not have any microstructuring of their own of the same order of magnitude, or alternatively the mean value of the spacing between adjacent raised parts formed by the microstructuring. By skilful selection of the type of microstructure and its typical length scale an advantageous secondary effect can be achieved that an otherwise laminar flow of reactants through the channel system, which due to the microstructuring has correspondingly microstructured channel walls and channel bases, can be deliberately made turbulent. The turbulent flow thus formed leads to a substantially improved exchange of reactants and reaction products with the corresponding electrode or gas-diffusion layer of an adjacent fuel cell. The advantageously turbulent flow is caused by breaks in the flow in the region of the microstructured channel walls and channel bases. This could only be realised in some other way with incomparably greater outlay, for example by high gas flows in the channels, which flows are mostly unfavourably high for the operation of the fuel cell and which cause the use of particularly strong pumps for the conveyance of the reactants, or by expensive attachment of obstacles in the channel system especially for this purpose.

Due to the design according to the invention, a foil can be used which has substantially thinner dimensions than is customary in the prior art. In order to achieve a particularly effective reduction of weight and size of a fuel cell stack of a given output voltage and in order simultaneously still to guarantee a sufficiently high rigidity of the foil and of the bipolar plate, the use of a foil having a thickness of less than 0.5 mm, but preferably between 0.05 mm and 0.2 mm, is recommended.

If the microstructure of the foil is so designed that it has trough-like depressions in the region of the channel bases, which depressions encourage an accumulation of fluid, advantageous drainage of condensed reaction products can be achieved and thus fluid accumulations in the region of the adjoining gas-diffusion layer or electrode of an adjacent fuel cell can be prevented. The flooding of the pores in the gas-diffusion system or of the electrodes with condensed water is thus prevented, which would make the conveyance of the reactants to the electrode more difficult. As "channel bases" are intended to be designated, here and at corresponding sites, regions of internal walls of channels forming the channel structures which are at a spacing from the adjacent gas-diffusion layer or electrode. A particular expedient embodiment provides for the trough-like depressions to be formed by recessed centres of hexagons, triangles or polygons forming the microstructure.

The advantageous effect of draining the reaction products, keeping regions of the channels adjoining the gas-diffusion layer or electrode free of condensate, can be further intensified if the foil forming the channels—in contrast to the channel bases—has hydrophobic properties in the region of a contact surface to the adjacent electrode or gas-diffusion layer. This can be achieved in a particularly propitious manner by superimposing a substructure (nanostructure) on the microstructure, utilising the Lotus effect. In order to achieve a Lotus effect, the substructure is designed with a typical length scale which differs in order of magnitude from the typical length scale of the microstructure; expedient is a typical length scale of the substructure of between 0.1 µm and 50 µm, preferably between 0.1 µm and 10 µm.

For the definition of the term "typical length scale" of the substructure, the same should apply as recorded above in connection with the microstructure. When the substructure producing the Lotus effect is of the fractal type, the quoted amounts for the typical length scale of the substructure should apply to the superordinate structure of the substructure. A practical realisation of the substructure provides a coating applied to the foil in the corresponding regions of the foil, said coating expediently being of a conductive material.

The present invention can be applied not only to bipolar plates for fuel cells but in general to electrochemical cells.

These can be electrochemical compressor systems such as electrolysers for example which, through the application of a potential, in addition to the generation of e.g. water and oxygen from water, simultaneously compress these gases under high pressure.

In addition also applicability to electrochemical systems such as electrochemical hydrogen systems is known for example, to which gaseous molecular hydrogen is supplied and this is then compressed electrochemically by the application of a potential. This electrochemical compression is particularly suitable for small amounts of hydrogen to be condensed since mechanical compression of the hydrogen would be considerably more expensive here.

BRIEF DESCRIPTION OF THE DRAWINGS

An embodiment of the invention will now be explained with the aid of FIGS. 1 to 4. These show.

DETAILED DESCRIPTION OF THE INVENTION

Figure 1:
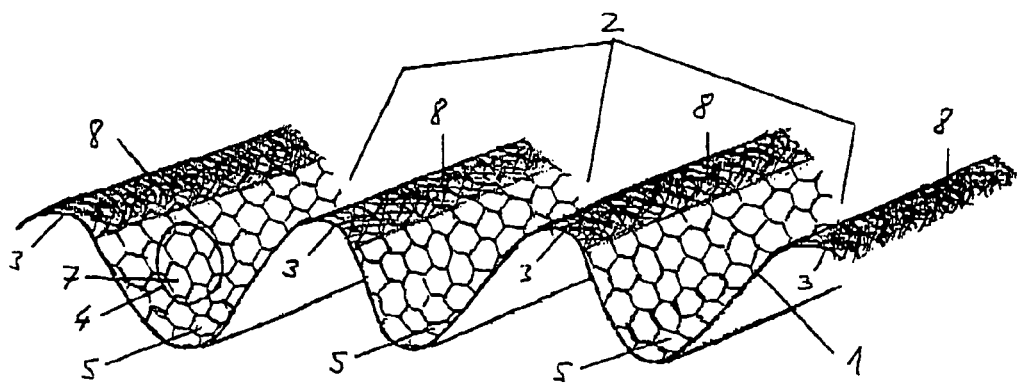
FIG. 1 in perspective view, a detail of a layer, formed from a microstructured foil, of a two-layer bipolar plate, FIG. 2 in plan view, a detail of the microstructured foil from FIG. 1, FIG. 3 a detail of the microstructured foil from FIG. 1 in the region of a channel base as a cross-section, and FIG. 4 as a cross-section, a detail of the foil from FIG. 1 in the region of a contact surface to an adjacent fuel cell electrode or gas-diffusion layer where it has a microstructure with a substructure.

In FIG. 1 can be seen a stainless steel foil 1 which is shaped to form a channel structure 2. The represented foil 1 is a constituent part of a two-layer bipolar plate, comprising two foils 1 of this type, for a stack of PEM fuel cells. The bipolar plate thus has channels formed on two opposite surfaces by the channel structure 2, which serve to convey reactants to an electrode (in the present case hydrogen to an anode or respectively oxygen to a cathode) of a fuel cell abutting against the corresponding side of the bipolar plate, and to carry away reaction products (here water produced at a cathode). Further channels forming between the two layers of the bipolar plate can carry cooling means for carrying reaction heat away to a cooling chamber. Through a contact surface 3 the foil 1 has contact with the corresponding electrode of the adjacent fuel cell. According to the invention, the foil 1, for the production of which aluminium or titanium can also be considered for example in addition to stainless steel, has a microstructure 4, which in the depicted example is formed in honeycomb manner by hexagons (hexahedra) having equal sides and equal angles and joined to one another covering the surface. This microstructure 4, embossed in the foil 1 together with the channel structure 2, imparts to the foil 1 an increased rigidity and permits the use of an extremely thin material for the foil 1, having a thickness of approximately 0.1 mm in the present example. In central regions of the channels, remote from the corresponding electrode of the adjacent fuel cell and described as channel bases 5, the microstructure 4 forms depressions 6 which cannot be recognised in this figure and which are realised by recessed centres 7 of hexagons forming the microstructure 4. The trough-like depressions 6 encourage an accumulation of fluid in the corresponding regions and thus an accumulation of condensed reaction products in the region of the channel bases 5. Due to such drainage of the reaction products, regions around the contact surfaces 3 to the adjacent fuel cell electrode are kept free of condensate, which makes possible an improved gas exchange and keeps the fuel cell from being "flooded". This effect is intensified in that the foil 1 is provided in the region of the contact surfaces 3 with coatings 8 which impart a hydrophobic property to the foil 1 at the corresponding points. To this end, the foil 1 has a substructure 9, applied with the coating 8 but not seen in the diagram, through which a property, known under the name "Lotus effect", is realised on the corresponding surface. A foil 1 shaped in the manner of the diagram can, instead of being a constituent part of a multilayer bipolar plate, also serve as a single-layer bipolar plate. The channel structure 2, forming on both sides of the foil 1 due to its shaping, can in this case be used for supplying reactants to the corresponding electrodes of two fuel cells adjacent to the bipolar plate and for the corresponding removal of reaction products.

Figure 2:
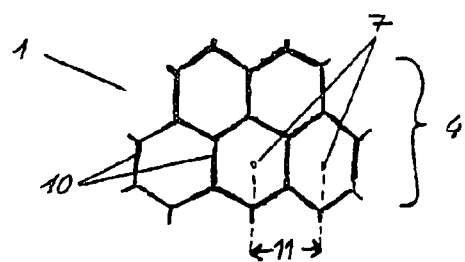

The detail shown in FIG. 2 of the foil 1 shown in FIG. 1 shows clearly the honeycomb-like microstructure 4 comprising joined-together hexagons of equal sides and equal angles embossed on the foil 1. The embossed hexagons form a framework comprising ridges/embossed lines 10, which imparts to the foil 1 its increased rigidity. Indicated also is a typical length scale 11 for the microstructure 4 of 10 μm in the example, which for the present case of a honeycomb-like microstructure 4 is defined as the distance between the centres 7 of two adjacent hexagons.

Figure 3:
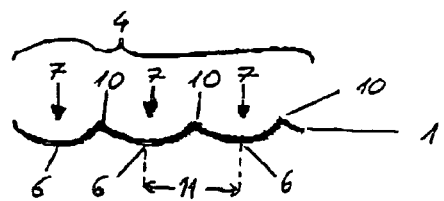

In FIG. 3 can be seen a detail of the foil 1 from FIG. 1 in the region of a channel base 5, in cross-section. Recognisable are the ribs 10 which delimit hexagons forming the microstructure 4 and form the framework supporting the foil 1. Recognisable too are defined trough-like depressions 6 which the foil 1 has in regions of the channel bases 5 respectively in the centres 7 of the hexagons, in order to cause drainage of the condensed reaction products in these regions.

Figure 4:
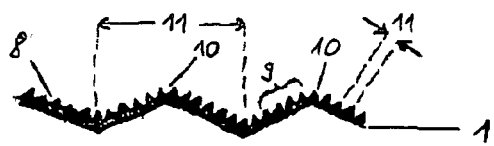

Finally in FIG. 4 a detail of the foil 1 from FIG. 1 can be seen in cross-section in the region of a contact surface 3, where the foil 1 has a substructure 9 superimposed on the microstructure 4. The substructure 9, which imparts hydrophobic properties, caused by the Lotus effect, to the foil 1 in the surroundings of the contact surfaces 3, is realized by a coating 8 applied to one side of the foil 1. In addition to the typical length scale 11 of the microstructure 4 (on the left in the diagram), a length scale 11 of a smaller order of magnitude, typical for the substructure 9, of 1 μm is indicated (on the right in the diagram). In the case of the substructure 9, the typical length scale 11 is defined as the centre distance between adjacent raised parts formed by the substructure 9. A surface of the foil 1 in the surroundings of the contact surfaces 3, which has a fractal structure, for example due to a corresponding coating 8, and in which therefore corresponding surface structurings are repeated on scales of even smaller orders of magnitude. In this way the Lotus effect, which encourages the draining of reaction products in the region of the channel bases, can be further intensified.

What is claimed is:

1. A bipolar plate for fuel cells comprising:
   a foil having a plurality of microstructures, said foil being at least partially conductive;
   at least one channel structure having a length scale that is an order of magnitude larger than said microstructures, formed by said foil comprised of a plurality of channels wherein a substructure having a length scale that is an order of magnitude smaller than said microstructures, is superimposed above the microstructures, said substructure defining a fractal pattern with said microstructures;
   whereby said channel structure selectively conveys a reactant; and
   whereby said plurality of micro structures are integrated into said foil, enhancing rigidity of said foil.

2. The bipolar plate as recited in claim 1, wherein each of said plurality of microstructures is generally shaped as a polygon.

3. The bipolar plate as recited in claim 1, wherein said plurality of microstructures cover a surface of said foil.

4. The bipolar plate as recited in claim 1, wherein said plurality of microstructures are formed by one of an embossing and an etching process.

5. The bipolar plate as recited in claim 1, wherein said at least one channel structure is formed by one of an embossing and an etching process.

6. The bipolar plate as recited in claim 1, wherein each of said plurality of microstructures has a length generally between 1 micrometer (μm) and 500 micrometers (μm).

7. The bipolar plate as recited in claim 1, wherein said foil has a thickness of less than about 0.5 millimeters (mm).

8. The bipolar plate as recited in claim 1, wherein said channel structure forms a channel base, said channel base being shaped as a trough-like depression for draining away condensed reaction products.

9. The bipolar plate as recited in claim 1, wherein each of said microstructures including a recessed center forms a trough-like depression.

10. The bipolar plate as recited in claim 1, wherein said foil is hydrophobic.

11. The bipolar plate as recited in claim 1, wherein each of said microstructures includes at least one of said substructures.

12. The bipolar plate as recited in claim 11, wherein said substructure has a length generally between 0.1 micrometer (μm) and 50 micrometers (μm).

13. The bipolar plate as recited in claim 11, wherein said substructure includes a coating.

14. A bipolar plate for fuel cells comprising:
   a foil having a plurality of microstructures formed onto a surface of said foil;
   at least one channel structure having a length scale that is an order of magnitude larger than said microstructures, formed by said foil comprised of a plurality of channels wherein a substructure having a length scale that is an order of magnitude smaller than said microstructures, is superimposed above the microstructures, said substructure defining a fractal pattern with said microstructures;
   whereby said channel structure selectively conveys a reactant to a proximate fuel cell; and
   whereby said plurality of microstructures enhance rigidity of said foil.

15. The bipolar plate as recited in claim 14, wherein each of said plurality of microstructures is generally shaped as a polygon.

16. The bipolar plate as recited in claim 14, wherein said at least one channel structure is formed by one of an embossing and an etching process.

* * * * *